United States Patent
Underwood et al.

(10) Patent No.: US 8,451,824 B2
(45) Date of Patent: May 28, 2013

(54) METHOD AND SYSTEM OF PROVIDING AN INTEGRATED SET-TOP BOX

(75) Inventors: Rosa Underwood, Washington, DC (US); Jimmie D. Peterman, Glenndale, MD (US); Lee E. Sattler, Mt. Airy, MD (US); Ronald S. Bernhey, Forrest Hill, MD (US); Shuoru Wang, Ellicott City, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1495 days.

(21) Appl. No.: 11/615,508

(22) Filed: Dec. 22, 2006

(65) Prior Publication Data

US 2008/0152110 A1  Jun. 26, 2008

(51) Int. Cl.
*H04L 12/66* (2006.01)

(52) U.S. Cl.
USPC .......................................... 370/352; 370/261

(58) Field of Classification Search
None
See application file for complete search history.

(56) References Cited

U.S. PATENT DOCUMENTS

| | | | |
|---|---|---|---|
| 6,535,590 B2 * | 3/2003 | Tidwell et al. | 379/110.01 |
| 6,993,722 B1 * | 1/2006 | Greer et al. | 715/739 |
| 2002/0061095 A1 * | 5/2002 | Beecroft | 379/110.01 |
| 2005/0091693 A1 * | 4/2005 | Amine et al. | 725/100 |
| 2006/0252457 A1 * | 11/2006 | Schrager | 455/556.1 |
| 2007/0191102 A1 * | 8/2007 | Coliz et al. | 463/42 |
| 2007/0233829 A1 * | 10/2007 | Shah et al. | 709/223 |
| 2007/0266406 A1 * | 11/2007 | Aravamudan et al. | 725/57 |
| 2008/0033917 A1 * | 2/2008 | Jones et al. | 707/3 |

* cited by examiner

*Primary Examiner* — Duc C Ho

(57) ABSTRACT

An approach is provided for voice, video and data services using an integrated set-top box. A packetized voice call is received (or placed) using a set-top box, wherein the set-top is configured to present video content on a display for viewing by a user. The set-top box includes a speakerphone for the user to participate in the voice call.

26 Claims, 7 Drawing Sheets

METHOD AND SYSTEM OF PROVIDING AN INTEGRATED SET-TOP BOX

BACKGROUND INFORMATION

The popularity and convenience of the Internet has resulted in the reinvention of entertainment and communication services. Users have turned, for example, to IP (Internet Protocol) telephony as a matter of convenience in that both voice and data services are accessible through a single piece of equipment, namely a personal computer. Also, online gaming has grown in popularity, as broadband data services have been widely adopted. Now that bandwidth has been made more readily available, consumers have engaged in viewing and exchanging video streams online. Consequently, there is great interest in providing more video applications, such as broadcast television, over the Internet. The integration of voice, video and data services poses a continual challenge in that these services traditionally have been under the auspices of different service providers with different business and engineering objectives. Therefore, from the perspective of the user, no end equipment has been devised to provide a seamless service.

Therefore, there is a need for providing an integrated approach to obtaining voice, video and data services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing an integrated set-top box to support voice, video and data services are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to an Internet Protocol (IP)-based voice, video and data services, it is contemplated that these embodiments have applicability to other equivalent data communication protocols.

Figure 1:
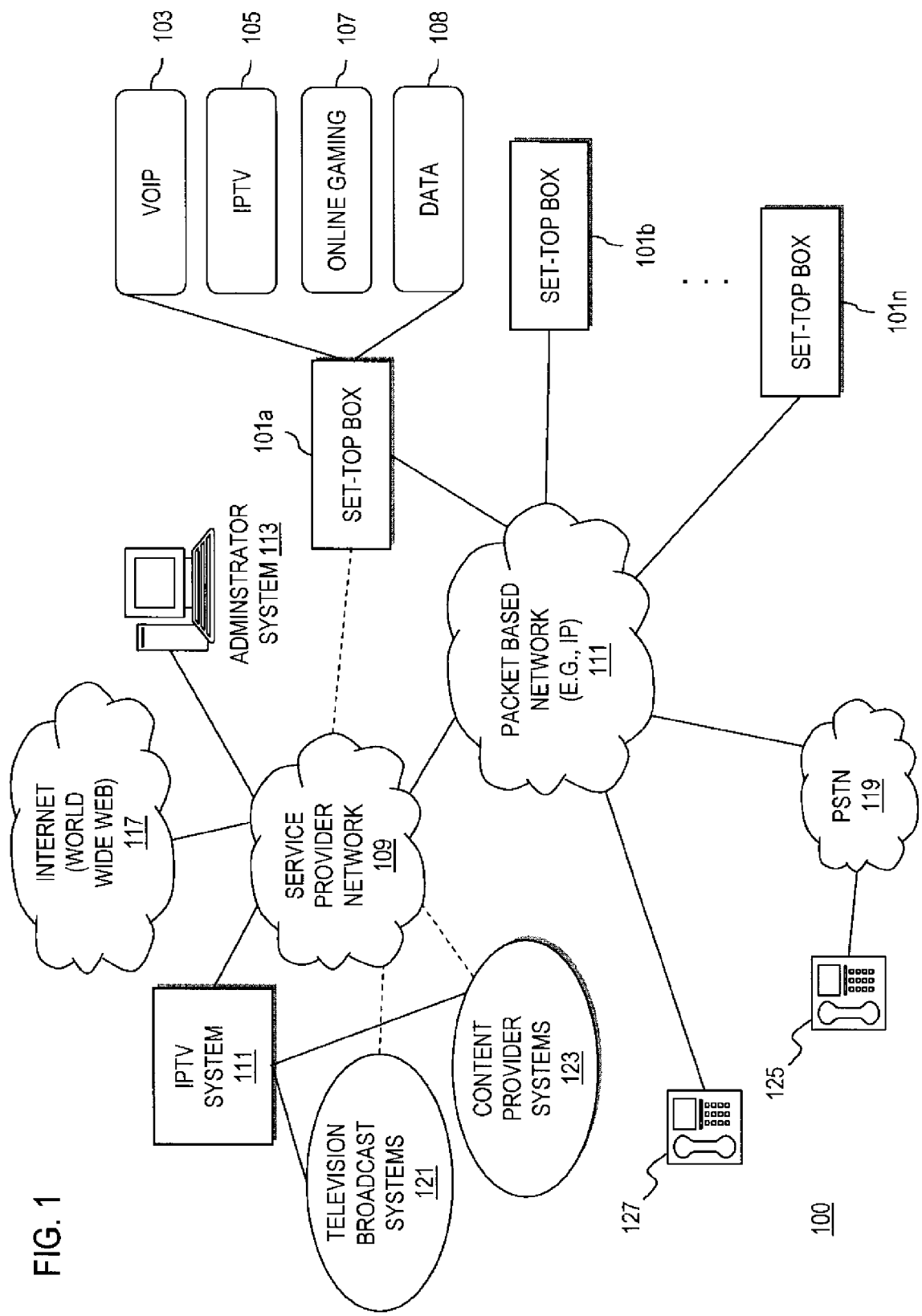
FIG. 1 is a diagram of a communication system capable of providing an integrated set-top box, according with an exemplary embodiment.

FIG. 1 is a diagram of a communication system capable of providing an integrated set-top box, according with an exemplary embodiment. A communication system 100 provides voice, video and data services to users via set-top boxes 101a-101n over data communication infrastructure (e.g., Internet Protocol (IP)-based applications and systems). In addition, any one of the set-top boxes 101a can also be directly linked to the service provider network 109, as shown for the set-top box 101a; such a link can be, for example, coaxial cable, optical cable, etc. It is noted that other customer premises equipment (CPE) can be utilized to support these services. In one embodiment, the set-top boxes 101 provide a Voice over IP (VoIP) function 103, an IP television (IPTV) function 105, and an online gaming function 107. These functions 103-108 are supplied by a service provider network 109 over a packet based network 111, which in an exemplary embodiment, is an IP-based network. The service provider network 109 includes an administrator system 113 for operational and management functions to deploy the voice, video and data services, using an IPTV system 115. The service provider network 109 also has connectivity to a public data network 117, such as the global Internet (or World Wide Web). The packet based network 111, in turn, can communicate with a public switched telephone network (PSTN) 119 for receiving and terminating calls. The IPTV system 115 can receive content from television broadcast systems 121 and other content provider systems 123.

In general, IP telephony, which is also referred to as Voice-over-IP (VoIP), is the conversion of voice information into data packets that are transmitted over an IP network. Four possible scenarios exist with the placement of a VoIP call: (1) phone-to-phone, (2) phone-to-set-top box, (3) set-top box-to-phone, and (4) set-top box-to-set-top box. In the first scenario of phone-to-phone call establishment, a call from a phone 125 is switched through PSTN 119 by a switch to a, e.g., voice gateway (not shown) of the packet based network 111. The packetized voice call is then routed to terminate at a VoIP phone 127. Under the second scenario, the phone 125 places a call to a set-top box 101a through the PSTN 119. This voice call is then switched by the packet based network 111, which forwards the voice call to a set-top box 101a. The third scenario involves the set-top box 101a placing a call to a voice station (e.g., phone 125, 127). Using a voice encoder (not shown), the set-top box 101a introduces a stream of voice packets into the packet based network 111. The voice gateway (not shown) converts the packetized voice information into a POTS (Plain Old Telephone Service) electrical signal, which is circuit switched to the voice station (e.g., phone 125). Lastly, in the fourth scenario, the set-top box 101a establishes a voice call with another set-top box 101b; in this case, packetized voice data is transmitted from the set-top box 101a via the packet based network 111 to the other set-top box 101a, where the packetized voice data is decoded.

Voice over IP can employ SIP for call control signaling. A detailed discussion of SIP and its call control services are described in the following IETF documents: RFC 2543, RFC 3261, RFC 3262, RFC 3263, RFC 3264, RFC 3265, RFC 3311, RFC 3325, RFC 3515, RFC 3840, RFC 3842, RFC 3891, RFC 3911, RFC 3959, RFC 3966, RFC 4028, RFC 4235, RFC 4412, and IETF Internet draft "SIP Call Control Services", Jun. 17, 1999; these documents are incorporated herein by reference in their entireties. SIP defines types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request. Another method is the BYE request, which indicates that the call should be released. In other words, BYE terminates a connection between two users or parties in a conference. The next method is the OPTIONS method; this method solicits information about capabilities and does not assist with establishment of a call. The REGISTER provides information about a user's location to a SIP server, for example. In addition to SIP, the system 100 can utilize other equivalent protocols, such as the International Telecommunication Union (ITU) H.323 protocol, which relates to providing audio-visual communication sessions on packet networks.

The IPTV system 111 supports the transmission of television video programs from the broadcast systems 121 as well as other content, such as video-on-demand services, from the content provider systems 123, using Internet Protocol (IP). That is, the IPTV system 111 delivers video streams in form of IP packets. Use of IP permits television service to be integrated with a broadband Internet services, and thus, share common connections to the customer premise. Also, IP packets can be more readily manipulated, and therefore, provide users with greater flexibility in terms of control.

Because video content is bandwidth intensive, the transmission facilities to the set-top boxes 101 can utilize fiber optic cables or other high capacity transmission media (e.g., Digital Subscriber Line (DSL) connections, cable television connections, etc.). Delivery of the video content, by way of example, is through a multicast from the IPTV system 111 to the set-top boxes 101. To tune to a channel, the set-top box 101a simply joins a multicast of the video content, using an IP Group Membership Protocol (IGMP) protocol (e.g., IGMP v2) to join a new multicast group, for example. This manner of video delivery avoids the need for expensive tuners to view television broadcasts however, other video delivery methods, such as cable, can be used. Also, the video content can be provided to various IP-enabled devices, such as personal computers (PC), personal digital assistants (PDAs), web-appliances, mobile phones, etc.

The set-top box 101 integrates all the functions of IPTV and VoIP, as well as online gaming functions in a manner that seamlessly toggles among these functions.

Figure 2:
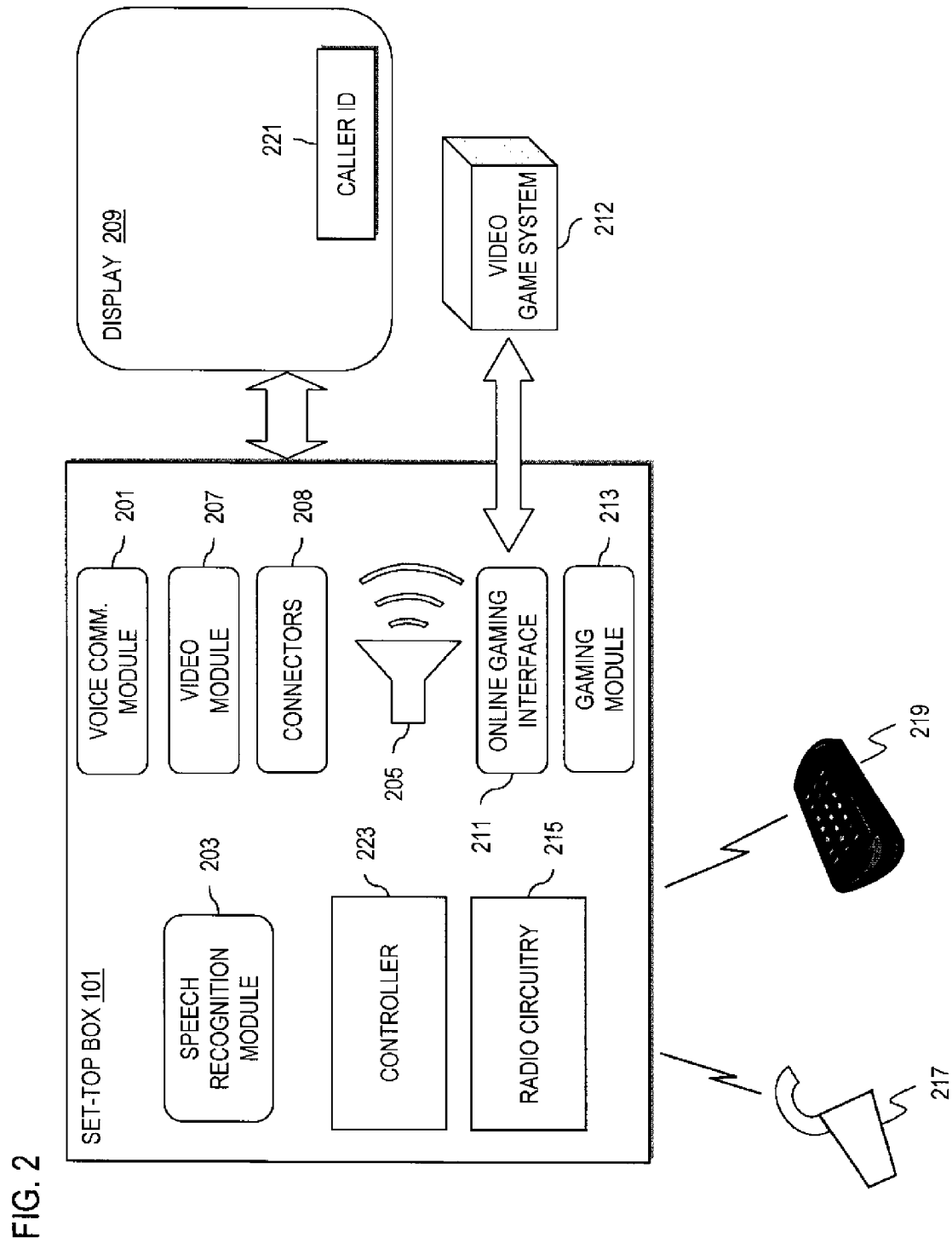
FIG. 2 is a diagram of an integrated set-top box configured to provide voice, video and data services over a data network, according to an exemplary embodiment.

FIG. 2 is a diagram of an integrated set-top box configured to provide voice, video and data services over a data network, according to an exemplary embodiment. The set-top box 101 includes a voice communication module 201 that interoperates with a speech (or voice) recognition module 203 to enable placement and receipt of packetized voice calls. A speakerphone 205 is used in conjunction with the voice communication module 201 to permit a user to communicate. A video module 207 receives video content and outputs the content via a connector 208 to a display 209. The connector(s) can provide various physical interfaces to the display 209 as well as other peripherals; the physical interfaces can include, for example, RJ45, RJ11, High Definition Multimedia Interface (HDMI), optical, coax, and universal serial bus (USB).

The set-top box 101 also includes an online gaming interface 211 for permitting the user to play a game with other users over the Internet 116, for example. The gaming interface 211 provides connection to a video game system 212. In addition to the separate game system 212, in an exemplary embodiment, a gaming module 213 can acquire and execute online games that are available over the Internet 116 or from a content provider.

The set-top box 101 can also interconnect via radio circuitry 215, with a headset/earpiece 217 using wireless technology, such as BLUETOOTH, etc. The radio circuitry 215 can also include circuitry for communicating with a remote control device 219. The wireless link with the remote control device 219 can use infrared, or radio frequency (RF) technology.

Under the arrangement of FIG. 2, the user can receive and places calls during viewing of a television program. For instance, notification of an incoming call can be visually provided on the display 209, in which a text box 221 can pop-up and display Caller ID (identification) information.

The functions and operation of the set-top box 101 is governed by a controller 223, which interacts with each of the components 201-209 and 215 to provide voice, video and data services. The user is afforded great functionality within the remote control device 219 to control these services, as more fully described below.

Figure 3:
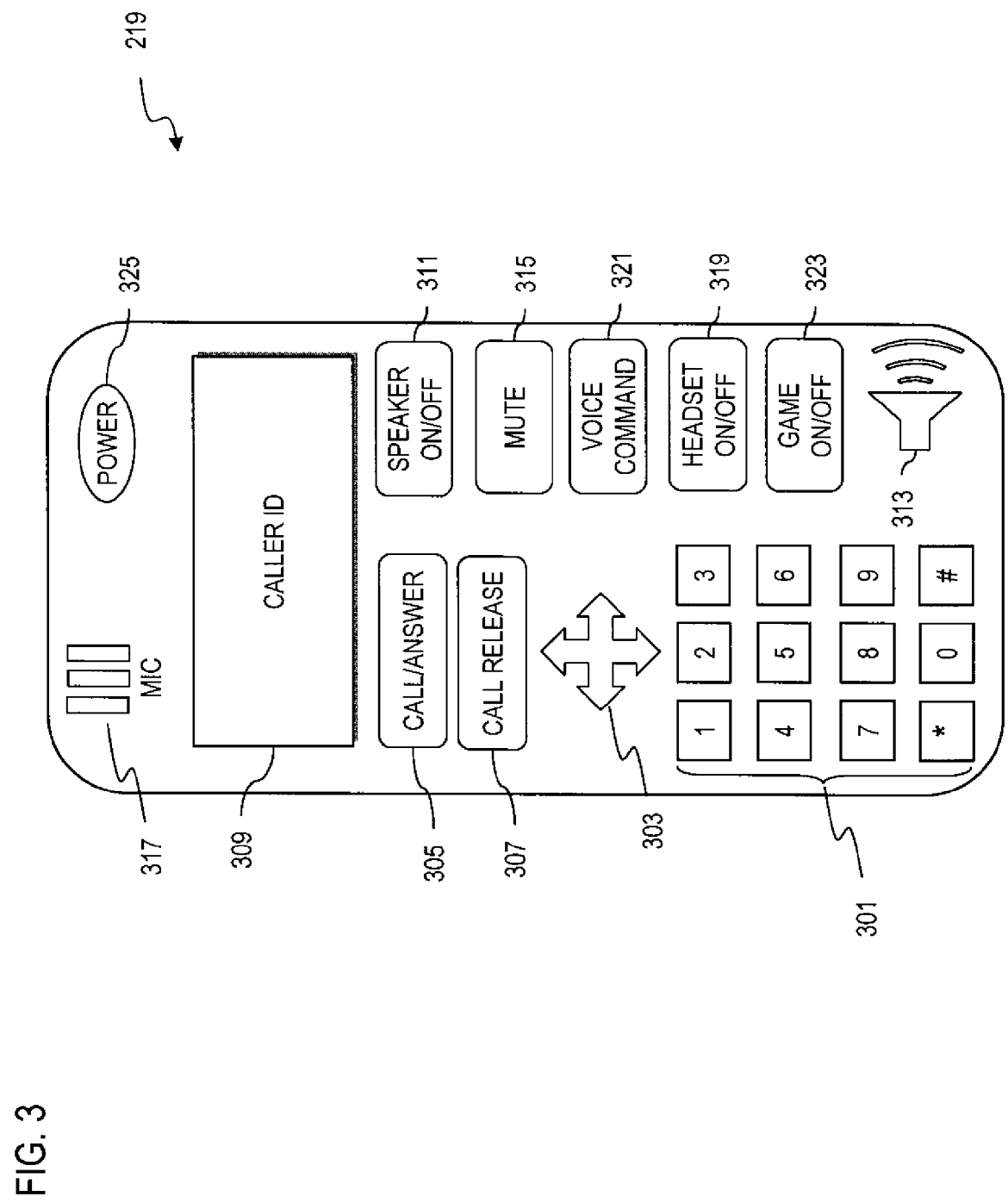
FIG. 3 is a diagram of a remote control device configured to communicate with the integrated set-top box of FIG. 1, according to an exemplary embodiment.

FIG. 3 is a diagram of a remote control device configured to communicate with the integrated set-top box of FIG. 1, according to an exemplary embodiment. By way of example, the remote control device 219 includes a dial-pad 301 to enter dialed digits for voice calls as well as channel selection. A cursor controller 303 can also be used to navigate through the IPTV channels; further, it can be adapted for other control functions. The remote control device 219 also includes a Call/Answer button 305 to accept calls and a Call Release button 307 to end calls. Also, the remote control device 219 can include a display 309 (e.g., LCD (liquid crystal display)) to present call information, such as Caller ID.

A Speakerphone ON/OFF button 311 can control the speakerphone 205 within the set-top box 101. Optionally, the remote control device 219 can itself provide a speaker 313. A Mute button 315 permits the user to mute the call so that the other party to the call is prevented from hearing the user. A microphone 317 can also be provided to enable the user to talk with the other party.

Alternatively, the user can conduct a call over the wireless headset/earpiece 217 by depressing a Headset ON/OFF button 319. The user can switch back and forth between the headset/earpiece 217 and the speakerphone 205 with this button 319. A Voice Command button 321, when enabled, invokes the voice recognition module 203 to accepting voice commands from the user to initiate a voice call. It is noted that the voice recognition module 203 can be configured to accept other voice commands for control of the set-top box 101.

The set-top box 101 includes a game ON/OFF button 323 to enable the audio functions when a video game is played.

Furthermore, the remote control device 219 includes a Power button 325 to turn the device 219 ON and OFF.

Figure 5:
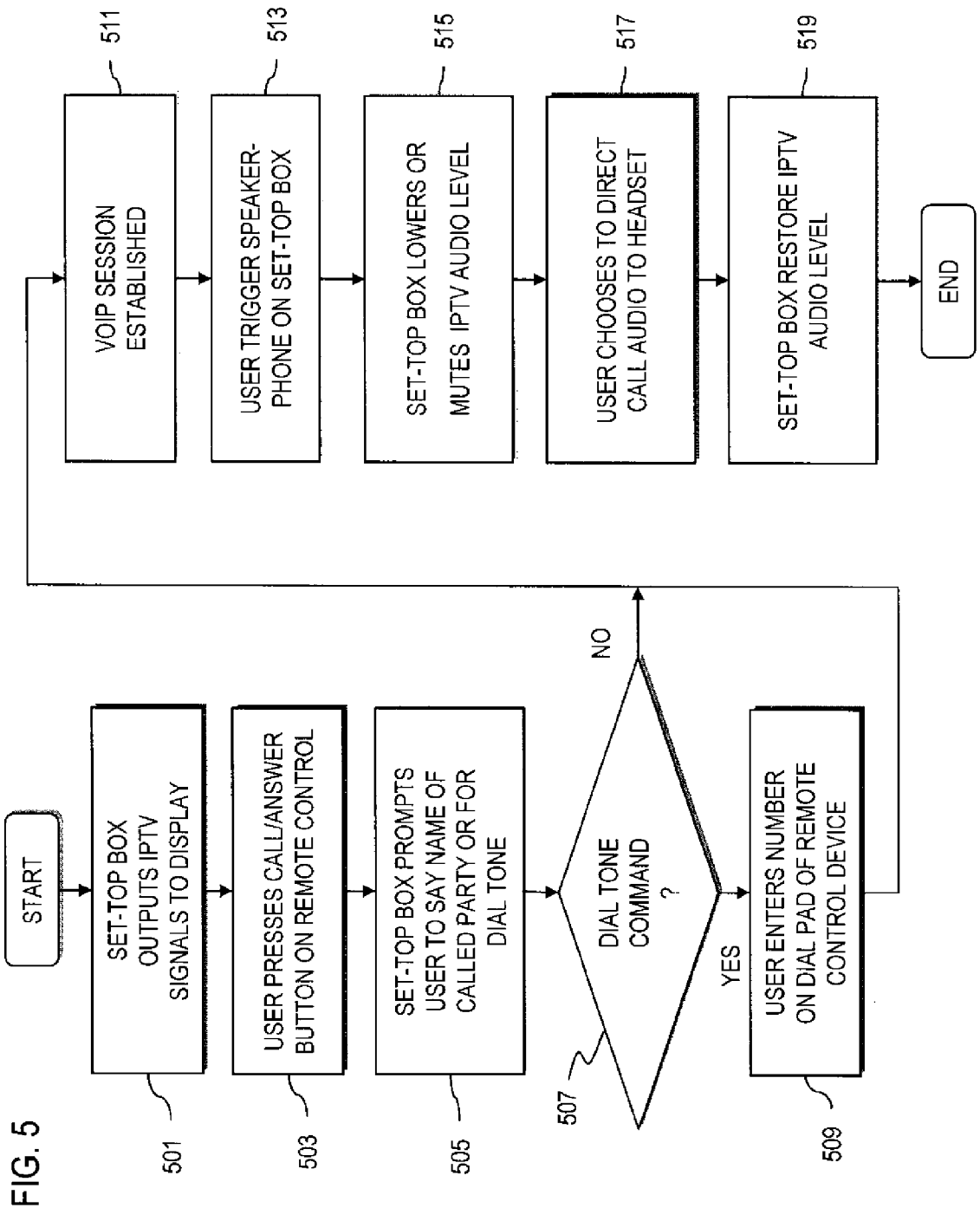
FIG. 5 is a flowchart of a process for placing a voice call from an integrated set-top box, according to an exemplary embodiment.
Figure 6:
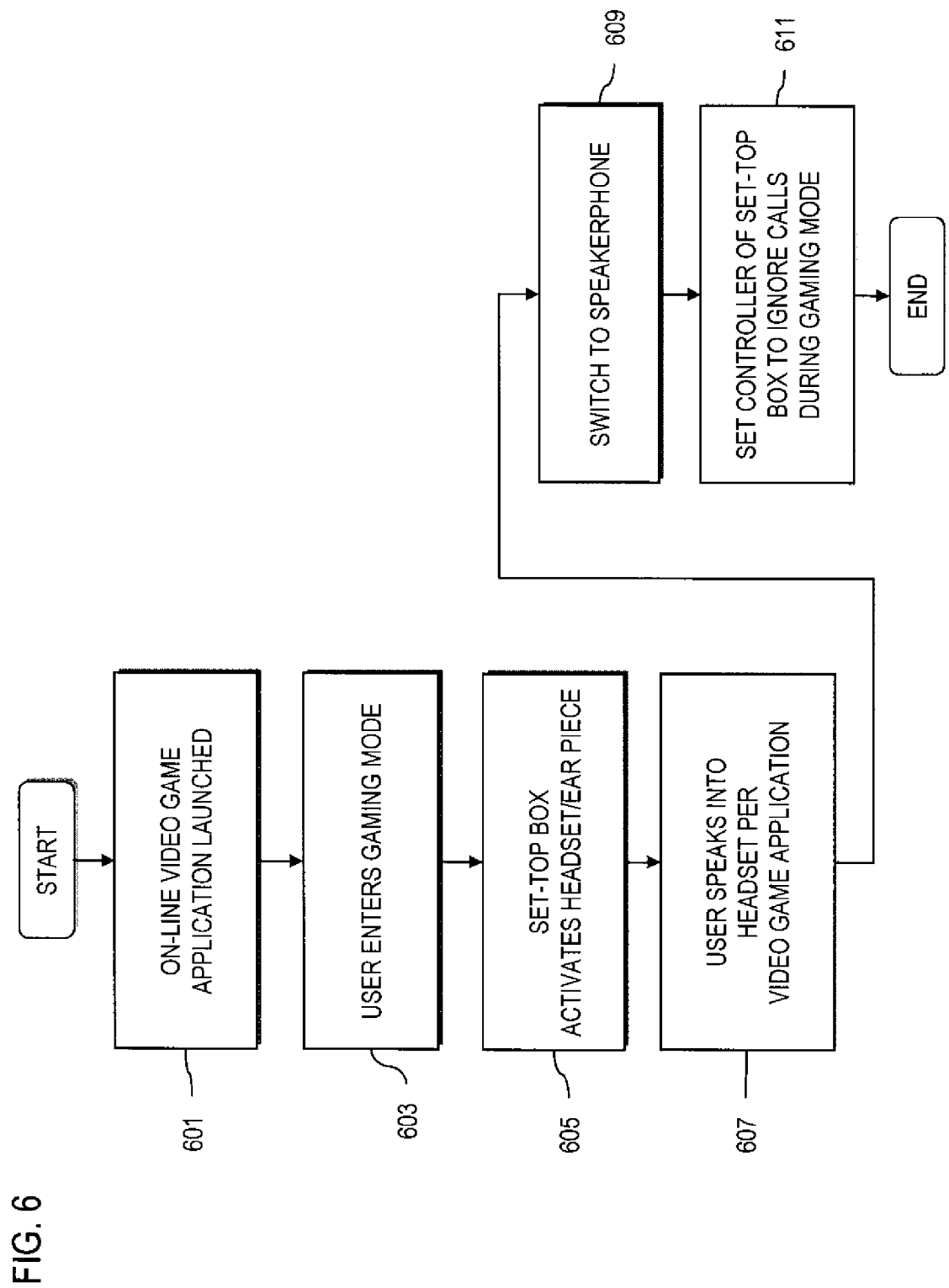
FIG. 6 is a flowchart of a process for operating in gaming mode using an integrated set-top box, according to an exemplary embodiment.

The operation of the set-top box 101, the remote control device 219 and the headset/earpiece 217 is now explained with respect to receiving and placing a call (FIGS. 4 and 5) as well as engaging in online gaming (FIG. 6).

Figure 4:
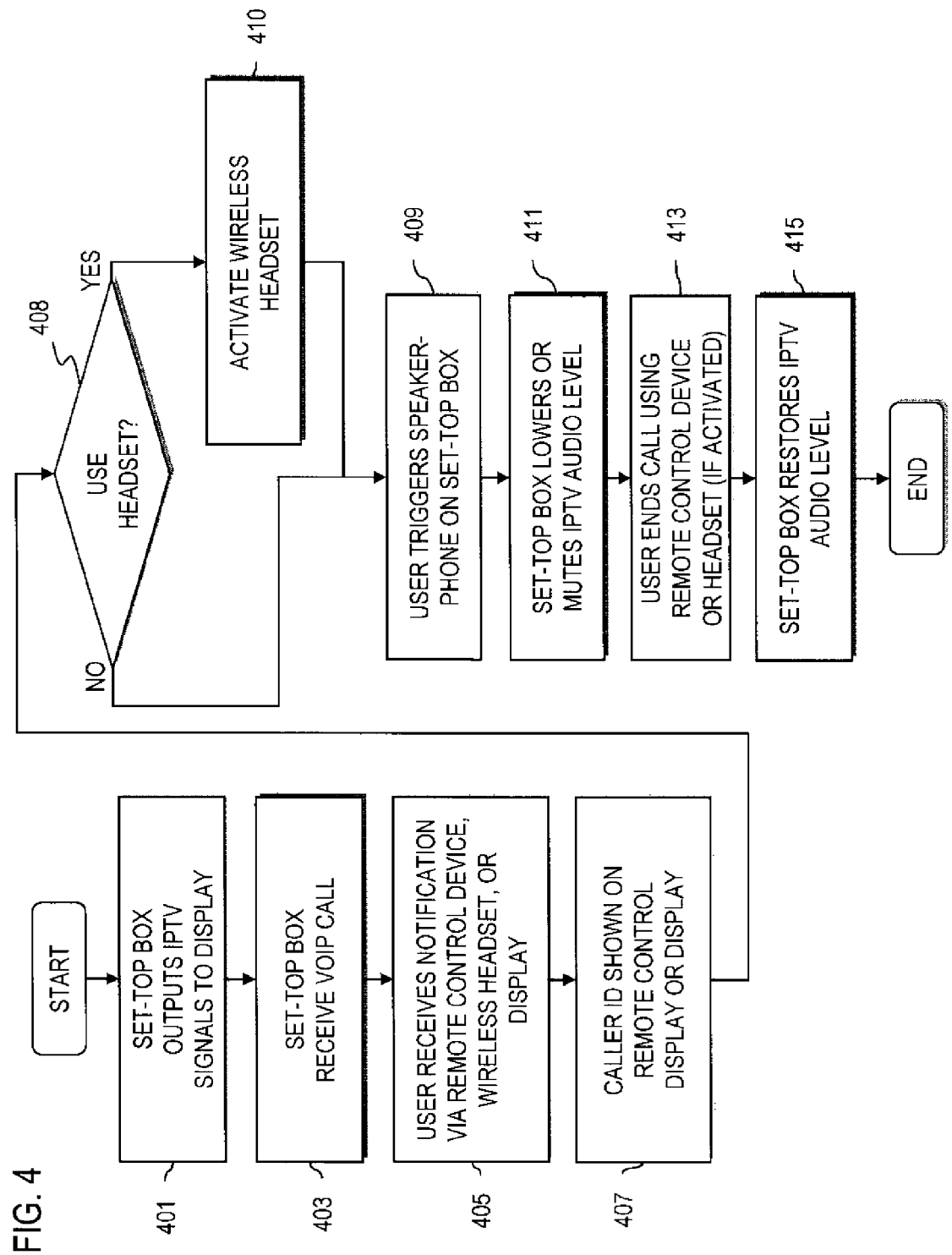
FIG. 4 is a flowchart of a process for receiving a voice call at an integrated set-top box configured to provide a speakerphone function, according to an exemplary embodiment.

FIG. 4 is a flowchart of a process for receiving a voice call at an integrated set-top box configured to provide a speakerphone function, according to an exemplary embodiment. In step 401, the user is watching a program, in which video content is received by the set-top box 101 and output to the display 209. In steps 403 and 405, the user receives a VoIP call, and is notified of such call through either the display 209 or the remote control display 309. In addition, the headset/earpiece 217 can be alerted to notify the user. Next, Caller ID information can be provided on the display 209 or the remote control display 309 (step 407). At this point, the user can elect to use either the speakerphone 205 or the wireless headset/earpiece 217 (as determined in step 408). If the user decides to use the speakerphone 205, the speakerphone 205 on the set-top box 101 is activated, per step 409; alternatively, the speaker 313 and the microphone 317 on the remote control device 219 can be used. However, the user can elect to use the wireless headset/earpiece 217 by activating it, as in step 410.

To answer incoming calls, the user can press the Call/Answer button 305. The user can transition between the speakerphone 205 and the wireless headset/earpiece 217 by depressing the Speaker ON/OFF button 311. Muting functionality is available for the speakerphone 205 and wireless headset/earpiece with the Mute button 315.

With the speakerphone 205 enabled, the set-top box 101 can automatically lower or mute the IPTV audio level, as in step 411. After carrying on the phone discussion, the user, per step 413, can end the call by pressing the Call Release button 307 on the remote control device 101 or by pushing an appropriate button on the wireless headset/earpiece 217. In step 415, the set-top box 101 restores the audio level of the IPTV session to the original audio level prior to the call.

FIG. 5 is a flowchart of a process for placing a voice call from an integrated set-top box, according to an exemplary embodiment. Under this scenario, the set-top box 101 is streaming video content to the display 209, as in step 501. The user can place a call by pressing the Call/Answer button 305 (per step 503) and using the dial-pad 301 on the remote control device 219. Alternatively, a "soft" dial-pad may be shown by the set-top box 101 to the display 209. The user may also press the Voice Command button 321 to invoke speech recognition for dialing. In one embodiment, upon depressing the Call/Answer button 305, a voice prompt through the speakerphone 205 (or speaker 313) instructs the user to say the name of the called party or the word "dial tone" to permit manual dialing (step 505). If the user says "dial tone" (as determined in step 507), the set-top box receives a "dial tone" over the speakerphone 205, and can manually use the dial-pad 301 on the remote control device 219, as in step 509. If the user says a name, a call is placed to, for example, a preprogrammed number associated with that name.

In step 511, the voice call is established. At some point during the call session, the user can elect to use the headset/earpiece 217, per step 513. The set-top box 101 can lower or mute the sound level, as in step 515. In step 517, the user uses the headset/earpiece 217 to release the call; at which point, the set-top box 101 can restore the audio level of the IPTV program that is in session (step 519).

The wireless headset/earpiece 217 and the speakerphone 205 (or microphone 317) can also function as a microphone for users of during the gaming mode.

FIG. 6 is a flowchart of a process for operating in gaming mode using an integrated set-top box, according to an exemplary embodiment. In step 601, video game application is launched. The user can press the Game ON/OFF button 323, as in step 603. In step 605, the headset/earpiece 217, or speakerphone 205 (or speaker 313 and microphone 317), is activated. The user can then speak into the headset/earpiece 217 in accordance with the game play, as in step 607. In step 609, the user switches to the speakerphone 205.

At any point during the game play or before, the user elects to have calls received by the set-top 101 be ignored during the gaming mode (step 611).

The above described processes relating to providing voice, video and data services using an integrated set-top may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
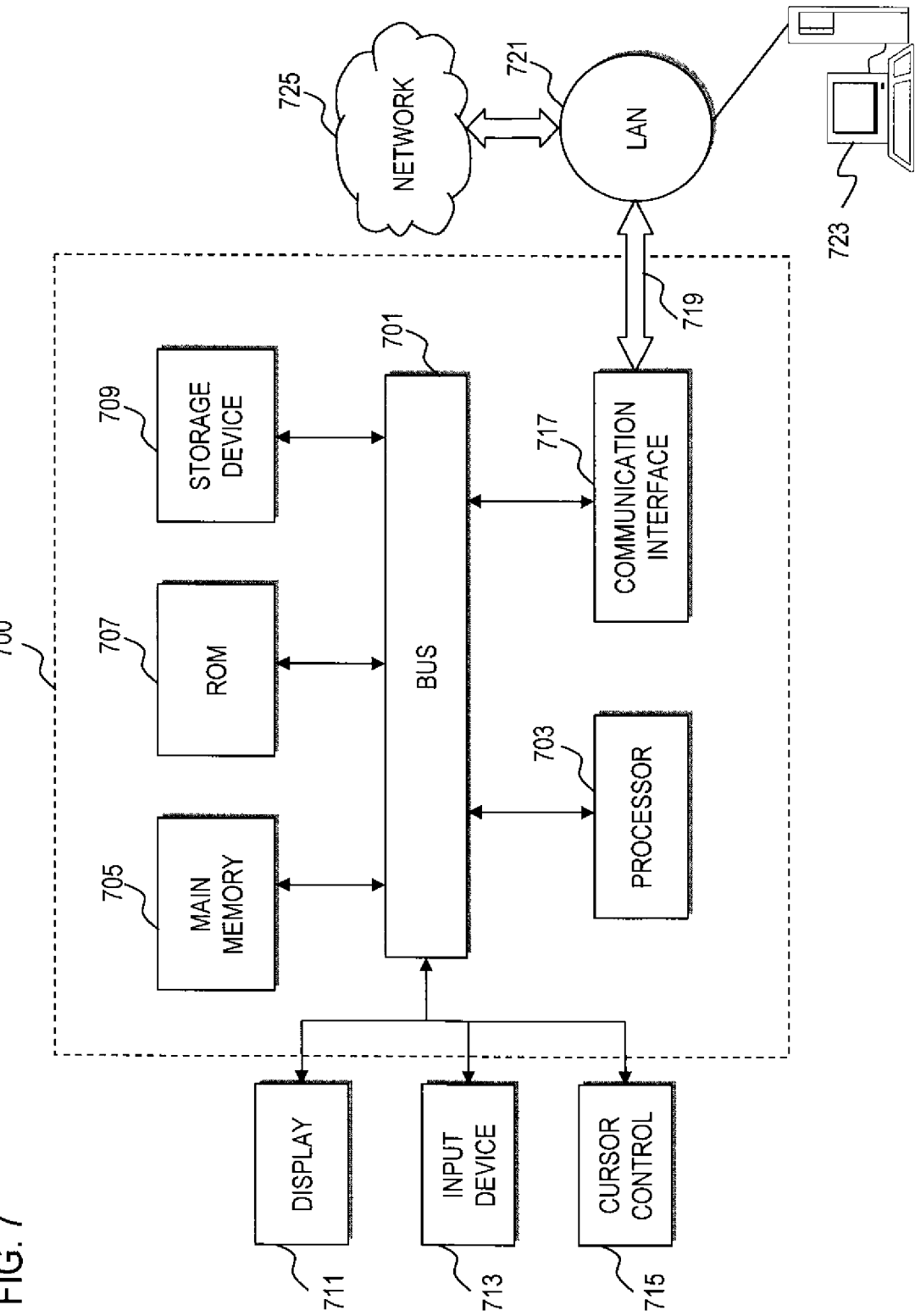
FIG. 7 is a diagram of a computer system that can be used to implement various exemplary embodiments.

FIG. 7 illustrates a computer system 700 upon which an exemplary embodiment can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the exemplary embodiment. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
conducting a packetized voice call using a set-top box, wherein the set-top box is configured to present video content on a display, the set-top box including a speakerphone;
activating the speakerphone within the set-top box to participate in the voice call; and
lowering an audio level associated with the video content in response to the activation of the speakerphone,
wherein the activation of the speakerphone is instructed from a remote control device.

2. A method according to claim 1, wherein the set-top box includes radio circuitry to communicate with a wireless headset or earpiece, the method further comprising:
activating the wireless headset or earpiece configured to process the voice call.

3. A method according to claim 1, further comprising:
receiving, by the set-top box, a telephone number inputted by the user through a speech recognition module of the set-top box or a dial-pad of a remote control device, wherein the voice call is terminated at the input telephone number.

4. A method according to claim 1, the method further comprising:
entering a gaming mode using the remote control device, wherein communication with another user is established over a data network according to a video game application; and
using the speakerphone to speak with the other user.

5. A method according to claim 4, further comprising:
ignoring subsequent voice calls after entering the gaming mode.

6. A method according to claim 1, further comprising:
instructing the set-top box to mute the voice call by using the remote control device.

7. A method according to claim 1, wherein the packetized voice call is conducted by way of the remote control device having a microphone and a speaker.

8. A method according to claim 1, wherein the audio level is independent from audio associated with the packetized voice call.

9. An apparatus comprising:
a voice communication module configured to support a packetized voice call;
a video module configured to output video content to a display;
a speakerphone configured to receive speech from a user for the voice call; and a controller configured to control the video module, the voice communication module and the speakerphone, and lower an audio level associated with the video content in response to activation of the speakerphone, wherein the activation of the speakerphone is instructed from a remote control device.

10. An apparatus according to claim 9, further comprising: radio circuitry configured to communicate with a wireless headset or earpiece configured to process the voice call.

11. An apparatus according to claim 9, further comprising: radio circuitry configured to communicate with the remote control device, the remote control device including a dial-pad for inputting a telephone number of a called party, wherein the voice call is terminated at the input telephone number.

12. An apparatus according to claim 9, further comprising: a speech recognition module configured to receive voice input from the user relating to a telephone number of a called party, wherein the voice call is terminated at the input telephone number.

13. An apparatus according to claim 9, the apparatus further comprising:
a gaming module configured to provide online gaming between a user and another user, wherein communication with another user is established over a data network according to a video game application, the speakerphone being used by the user to speak with the other user.

14. An apparatus according to claim 9, wherein the controller receives an instruction from a remote control device to mute the voice call.

15. A method comprising:
communicating, using a remote control device, with a set-top box to initiate a packetized voice call, wherein the set-top box is configured to present video content on a display, the set-top box including a speakerphone;
activating, using the remote control device, a speakerphone within the set-top box to participate in the voice call; and
lowering an audio level associated with the video content in response to the activation of the speakerphone.

16. A method according to claim 15, wherein the set-top box includes radio circuitry to communicate with a wireless headset or earpiece configured to process the voice call.

17. A method according to claim 15, further comprising: transmitting a telephone number inputted by the user through a dial-pad of the remote control device, wherein the voice call is terminated at the input telephone number.

18. A method according to claim 15, further comprising: receiving speech from a user, wherein the speech represents a telephone number of a called party; and transmitting speech from the user to the set-top box, the set-top box including a speech recognition module configured to output a telephone number, wherein the voice call is terminated at the telephone number.

19. A method according to claim 15, the method further comprising:
entering a gaming mode using the remote control device, wherein communication with another user is established over a data network according to a video game application.

20. A method according to claim 15, further comprising: instructing the set-top box to mute the voice call by using a remote control device.

21. An apparatus comprising:
a call button configured to control a set-top box to initiate a packetized voice call, wherein the set-top box is configured to present video content on a display, the set-top box including a speakerphone; and
a speaker button configured to control a speakerphone within the set-top box and lower an audio level associated with the video content in response to activation of the speakerphone, the speakerphone being configured to receive speech relating to the voice call from the user and the speakerphone also being configured to be activated by way of a remote control device.

22. An apparatus according to claim 21, wherein the set-top box includes radio circuitry to communicate with a wireless headset or earpiece configured to process the voice call.

23. An apparatus according to claim 21, further comprising:
a dial-pad configured to receive a telephone number from the user, wherein the voice call is terminated at the input telephone number.

24. An apparatus according to claim 21, wherein the set-top box includes a speech recognition module configured to receive speech from the user, and to output a telephone number of a called party in response to the received speech, wherein the voice call is terminated at the input telephone number.

25. An apparatus according to claim 21, the apparatus further comprising:
a game mode button configured to enter a gaming mode, wherein communication with another user is established over a data network according to a video game application.

26. An apparatus according to claim 21, further comprising:
a mute button configured to instruct the set-top box to mute the voice call.

* * * * *